2,353,572

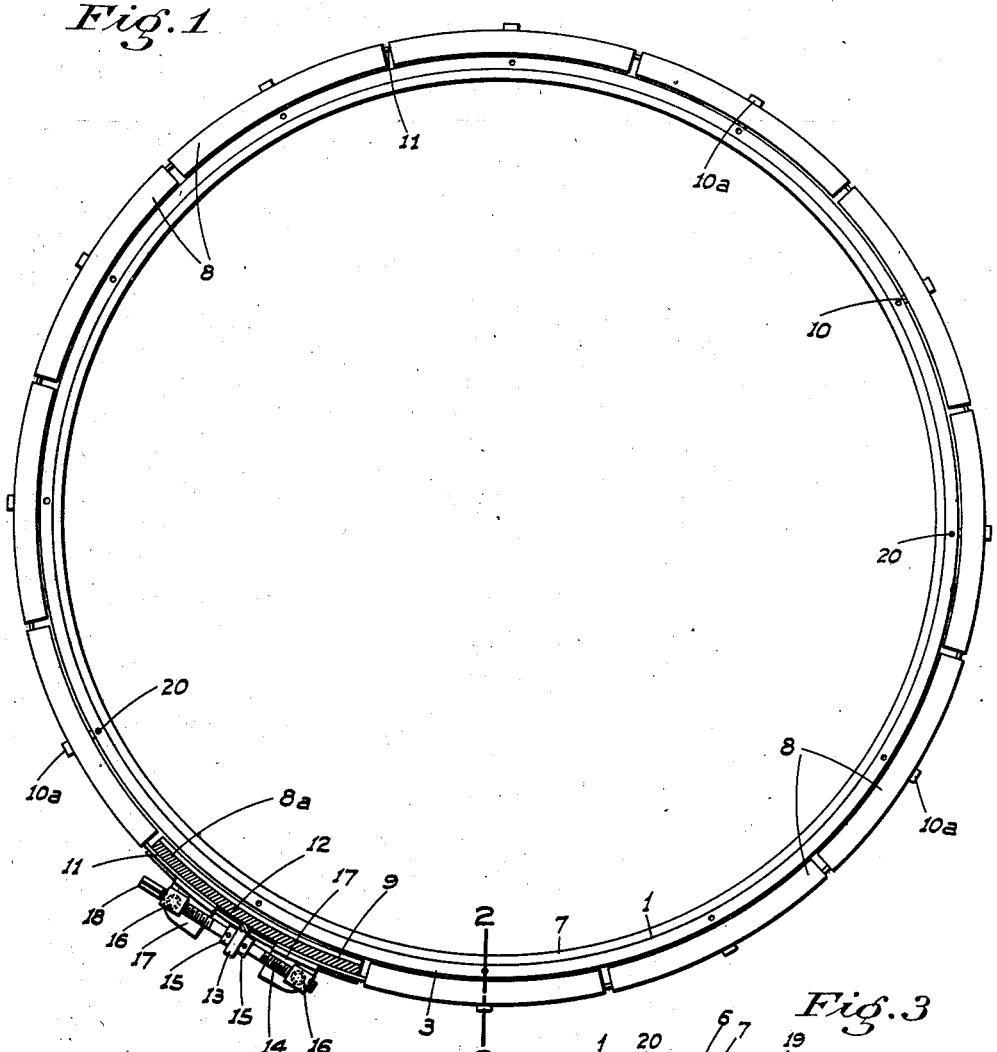
July 11, 1944.  W. H. KUSTER ET AL  2,353,572
FLANGE COUPLING AND LOCKING UNIT
Filed Aug. 7, 1942
INVENTORS
Wm H. Kuster
Edwin A. Glynn
ATTORNEYS Patented July 11, 1944

UNITED STATES PATENT OFFICE 2,353,572

FLANGE COUPLING AND LOCKING UNIT

William H. Kuster, San Francisco, and Edwin A. Glynn, Lodi, Calif.

Application August 7, 1942, Serial No. 454,060

11 Claims. (Cl. 285—129)

This invention relates to devices for coupling abutting endless circular flanges together, and has been particularly designed to couple the flanges on the adjacent open ends of the sections of a vulcanizing kettle such as is shown in our co-pending application, Serial No. 454,059, filed August 17, 1942, and in which the vulcanizing action is effected by gas under pressure, which tends to separate the kettle sections.

The principal object of this invention is to provide a coupling unit which is permanently mounted on one section adjacent the flange thereof, and by means of which the flanges of the two sections when brought together in abutting relationship may be positively held against separation.

A further object is to provide a unit for the purpose so constructed that the coupling and locking operation is performed from a single point at the circumference of the flanges, while the locking action will be effective about the entire circumference of the flanges, and will give uniform stress distribution throughout the material of the flanges.

Another object is to provide a device of this character constructed so as to enable a coupling or uncoupling operation to be very easily and quickly effected.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawing similar characters of reference indicate corresponding parts in the several views:

Figure 1 is an end elevation partly in section of a flange member provided with our improved coupling unit.

Figure 2 is an enlarged fragmentary radial section on the line 2—2 of Fig. 1, showing the coupling unit open or disengaged and the adjacent flanges separated.

Figure 3 is a similar view but showing the flanges abutting and the coupling unit in a locked position.

Referring now more particularly to the characters of reference on the drawing, 1 and 2 denote a pair of separate endless ring members, which at their adjacent ends are provided with outwardly projecting flanges 3 and 4 respectively. These members are mounted on and project from shell sections 5 which are arranged, as shown in said copending application, for axial movement to and from each other; the adjacent faces of the members and flanges being machined so as to closely engage each other when the sections are brought together. The member 1 is provided with a continuous circular recess 6 open to the interior and to the outer end face of said member; a flexible sealing gasket 7 of U-shaped form in cross section being seated in said recess. If pressure conditions are higher inside than outside members 1 and 2, the gasket is disposed as shown, or with the U opening facing inwardly. If pressure conditions are the reverse, the U opening of the gasket would face outwardly. When the rings are brought together in abutting relationship, therefore, the gasket becomes enclosed in the groove formed between the members and is engaged with both of the same, the relatively high pressure in the gasket opening tending to force the sides of the gasket apart and maintaining them in positive sealing engagement with the adjacent surfaces.

The coupling unit comprises a plurality of separate ring segments 8 each having a circumferential groove 9 on its inner face of a width sufficient to closely straddle both flanges 3 and 4 when the latter abut. The total combined length of the segments is such that they form a substantially continuous unit about the flanges when engaged with the same.

The segments are mounted in fixed connection with the member 1 for limited radial movement relative thereto by means of headed guide pins 10 secured in said member radially thereof beyond the flange 3 and projecting through the segments in relatively slidable relationship, each segment having one pin centrally of its length, or in any case a pin arrangement such that the segment may move radially of the flanges. The guide pins are disposed so that one side of the groove 9 always substantially alines with the adjacent side edge of the flange 3, and the heads 10a on the pins allow of radial outward movement of the segments sufficient to enable the flange 4 to then move axially and clear of the segments into or out of engagement with the flange 3.

The clearance between the guide pins in their bores is greater than that between the adjacent groove and flange faces, so that no shearing strains are placed on the pins when the flanges are coupled, even if a certain distortion due to strain should be present in the flanges.

The movement of the segments is controlled by a resilient transversely split band 11 extending about all the segments and slidably retained in a circumferential groove or slot 12 in the segments radially out from the groove 9, said groove 12 being headed over the band as shown at 12a, so that the band cannot move radially out relative to the segments. A lug 13 is rigid with and projects radially out from one segment 8a centrally of its ends, the band ends lying in said segment on opposite sides of the lug, as shown in Fig. 1. This lug forms a bearing for a right and left hand screw 14 retained against axial movement relative to the lug by collars 15. The screw projects through right and left hand tapped bosses or nut 16 swivelly mounted on ears 17 rigid with and projecting radially out from the band ends. At one end the screw is squared or otherwise formed as at 18 for engagement with a wrench or other turning tool.

It will thus be seen that upon turning the screw in one direction or the other the diameter of the band becomes altered, and since it cannot escape from the segments, the latter are moved in or out one after the other from each end of the band. The heads on the pins obviously form stops which limit outward movement of the segments, and the expansing force of the band by manipulation of the screw is therefore transferred successively to one segment after another, as each in turn is moved out into engagement with its stop, until all segments are moved to the same extent. The segments thus finally assume positions concentric with the flanges so as to insure clearance of the segments from the flange 4 when the coupling unit is in open position, so as to permit of the desired free axial movement of the flange 4 to or from the flange 3. When the diameter of the band is contracted, all the segments are moved in until they all evenly embrace both flanges so that the latter are confined in the segment grooves 9 and thus are prevented either from axial separation or from relative radial movement.

In order to positively dispose the flanges in alinement with each other when brought together, tapered pins may be mounted in rigid connection with member 2 in circumferentially spaced relation and project beyond the end face thereof for engagement with correspondingly disposed sockets in member 1. This arrangement, as recited in our copending application, Serial No. 454,058, filed August 7, 1942, now Patent No. 2,346,973, issued April 18, 1944, provides mutual support for the members when brought together, and takes up any sag or distortion of the members which may be caused by their own weight and other factors.

The use of a number of separate segments as the coupling members assures of a complete lock of the flanges together even if the members 1 and 2 be initially out of round, and also enables the members to reassume a true circular form after they are coupled and locked, as when acted on and influenced by internal pressures.

It will be noted that the shell sections 5 are symmetrically alined with the corresponding flanges 3 and 4. This avoids any bending movements or stresses against the flanges other than those tending to impart direct tensional or parallel movement of the flanges, as might tend to be imparted thereto by pressures confined within the shell sections.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In combination, a pair of endless flanges adapted to abut against each other, and a coupling unit mounted in fixed connection with one flange and operable to engage the flanges throughout their extent when the latter are abutted to then prevent separation of the flanges.

2. In combination, a pair of endless flanges adapted to abut against each other, and a coupling unit mounted in fixed connection with one flange adapted and operable to engage both flanges only when the latter are abutted, to then prevent relative movement between the flanges.

3. In combination with a pair of separate ring members each having an outwardly projecting endless flange at its outer end, the flanges being adapted to abut each other and to be moved apart in an axial direction, a coupling segment having an internal circumferential groove of a width to straddle the abutted flanges, means mounting the segment on one member for radial movement relative thereto so that the segment may be drawn from a flange straddling position to one clear of the path of movement of the flange of the other member and means to control the movement of the segment.

4. In combination with a pair of separate ring members each having an outwardly projecting endless flange at its outer end, the flanges being adapted to abut each other and to be moved apart in an axial direction, a coupling unit including a plurality of separate segments grouped about the flange of one member and internally grooved circumferentially to straddle both flanges when the latter are abutted, means mounting the segments in connection with one member for radial movement thereon and means to move all the segments in consecutive order.

5. In combination with a pair of separate ring members each having an outwardly projecting endless flange at its outer end, the flanges being adapted to abut each other and to be moved apart in an axial direction, a coupling unit including a plurality of separate segments grouped about the flange of one member and internally grooved circumferentially to straddle both flanges when the latter are abutted, means applied to all the segments to increase or decrease the diameter of the circle outlined thereby and means mounting the segments in connection with one member so that with such movement of the segments they will remain concentric with the flanges.

6. In combination with a pair of separate ring members each having an outwardly projecting endless flange at its outer end, the flanges being adapted to abut each other and to be moved apart in an axial direction, a coupling unit including a plurality of separate segments grouped about the flange of one member and internally grooved circumferentially to straddle both flanges when the latter are abutted, means mounting each segment on one member for radial movement, and means applied to all the segments to impart radial movement thereto and to the same radial extent.

7. In combination with a pair of separate ring members each having an outwardly projecting endless flange at its outer end, the flanges being adapted to abut each other and to be moved apart in an axial direction, a coupling unit including a plurality of separate segments grouped about the flange of one member and internally grooved circumferentially to straddle both flanges when the latter are abutted, a transversely split band embracing and connected to all the segments in circumferentially slidable relationship but movable radially therewith, means to expand and contract the band and means mounting the segments on one ring member so that with such movement of the band and segments, the segments will remain concentric with the member and its flange.

8. A structure as in claim 7 in which the band ends are disposed in spaced relation on one segment, and the band contracting and expanding means comprises a right and left hand screw mounted on said one segment and held against axial movement relative thereto and tapped members connected to the band adjacent its ends and through which the screw is threaded.

9. A structure as in claim 7, in which the segment mounting means comprises a radial guide pin for each segment mounted in the ring member to one side of the corresponding flange and on which the segment is slidable.

10. In combination with a pair of separate ring members each having an outwardly projecting endless flange at its outer end, the flanges being adapted to abut each other and to be moved apart in an axial direction, a coupling unit including a plurality of separate segments grouped about the flange of one member and internally grooved circumferentially to straddle both flanges when the latter are abutted, means mounting the segments on one ring member for radial movement relative thereto and so that one side of the groove alines with the back side of the flange of said member, and means to move the segments radially.

11. A structure as in claim 7 with a stop for each segment limiting radial outward movement thereof.

WILLIAM H. KUSTER.
EDWIN A. GLYNN.